United States Patent
Wade et al.

(10) Patent No.: US 8,262,969 B2
(45) Date of Patent: Sep. 11, 2012

(54) APPARATUS AND METHOD FOR MANUFACTURING AN AIRCRAFT STRINGER

(75) Inventors: Darrell A. Wade, Wichita, KS (US); Thanh A. Le, Wichita, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 0 days.

(21) Appl. No.: 12/576,889

(22) Filed: Oct. 9, 2009

(65) Prior Publication Data
US 2011/0084428 A1  Apr. 14, 2011

(51) Int. Cl.
*B27N 3/10* (2006.01)
(52) U.S. Cl. .................................................... 264/257
(58) Field of Classification Search .................... 264/257
See application file for complete search history.

(56) References Cited

U.S. PATENT DOCUMENTS

| 2008/0110563 A1* | 5/2008 | Engwall et al. ............... 156/285 |
| 2008/0302912 A1* | 12/2008 | Yip et al. ....................... 244/119 |
| 2010/0009124 A1* | 1/2010 | Robins et al. ................. 428/156 |

* cited by examiner

*Primary Examiner* — Larry Thrower
(74) *Attorney, Agent, or Firm* — Hovey Williams LLP

(57) ABSTRACT

An apparatus and method of forming a stringer or an integral stringer and fuselage skin. The apparatus may be a solid bladder made of silicone, urethane, or any similar material or combination thereof. The method may comprise placing composite material onto a surface of a tooling having a channel sized and shaped to correspond to a desired stringer size and shape. Then the solid bladder may be placed onto the composite material relative the channel. The shape of the solid bladder may correspond to the shape of the channel. Composite material may then be placed over the solid bladder, vacuum-sealed against the bladder and the tooling, and cured to harden the composite material, thereby forming a stringer or an integral stringer and fuselage skin.

7 Claims, 4 Drawing Sheets

APPARATUS AND METHOD FOR MANUFACTURING AN AIRCRAFT STRINGER

BACKGROUND

1. Field

The present invention relates to aircraft components. More particularly, the invention relates to a method and apparatus for manufacturing an aircraft stringer.

2. Related Art

To fabricate a composite integrated stinger and fuselage skin structure for an aircraft, vulcanized rubber hollow tubes with stiffened inserts are placed within the hollow stringer sections. Autoclave pressure keeps the stringer section from collapsing during the automatic fiber placement (AFP) and composite cure cycle. The vulcanized rubber hollow tubes, for example, are typically pressurized to provide pressure of 85 lbs/sq. in. to the composite material making up the hollow stringer section, pressing the composite material against a tooling.

The stiffened inserts can be made of a variety of materials. For example, the stiffened inserts can be made of rubber, such as a different type of rubber than used in the hollow tube. The stiffened inserts slide inside the hollow tube to reinforce the hollow tube and keep the tube from collapsing during AFP of composite material against an outer wall of the hollow tube.

Unfortunately, the rubber hollow tubes can sometimes burst, ruining the composite part. Additionally, the hollow tubes are costly and require frequent replacement, since the rubber shrinks and the tube loses its pressure integrity with each subsequent cure cycle.

Accordingly, there is a need for an apparatus and method for supporting a stringer during AFP and/or a cure cycle that overcomes the limitations of the prior art.

SUMMARY

Embodiments of the present invention provide a method and apparatus for manufacturing an aircraft stringer. One embodiment of the invention is a solid bladder of silicone, urethane, or similar materials and a method of using the solid bladder to provide support inside of a composite aircraft stringer during its manufacture. Elastomer material properties and sizing desired for the bladder may be determined using Finite Element Analysis (FEA). Additionally, the solid bladder may be sized and shaped according to a desired size and shape of a composite stringer and a size and shape of a corresponding tooling.

The tooling may be made of metal and may comprise a channel sized and shaped to correspond to a size and shape of an outer surface of one or more of the composite stringer's walls. The bladder be configured to provide an appropriate contact force for creating uniform pressure throughout the composite stringer during the curing cycle.

In use, a composite material may be placed into the channel of the tooling and then at least partially covered by the bladder. Additional composite material may be placed over an exposed face of the bladder, and the composite material and bladder may be vacuumed-bag sealed against the tool and cured in an autoclave.

These and other important aspects of the present invention are described more fully in the detailed description below.

BRIEF DESCRIPTION OF THE DRAWING FIGURES

Embodiments of the present invention are described in detail below with reference to the attached drawing figures, wherein.

Figure 1:
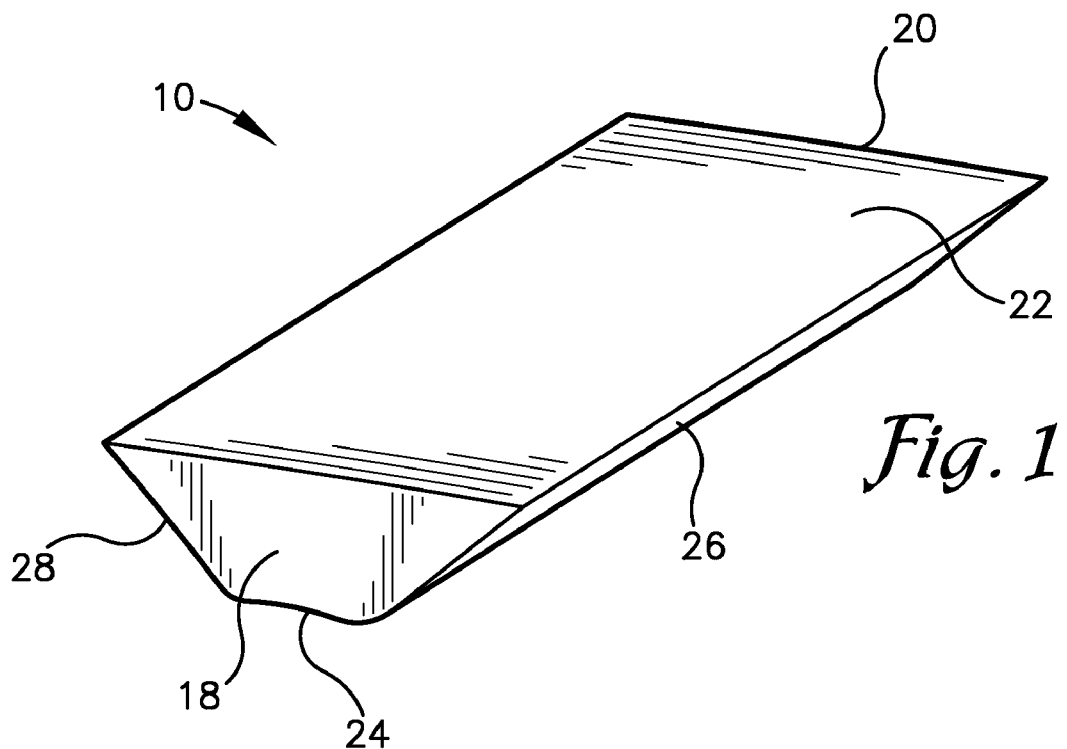
FIG. 1 is a perspective view of a solid bladder constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of various embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
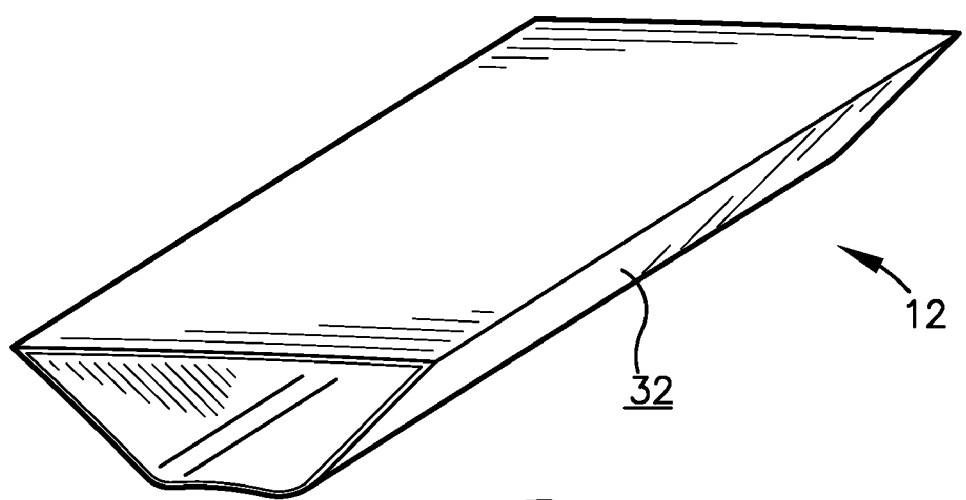
FIG. 2 is a perspective view of a stringer formed using the solid bladder of FIG. 1.
Figure 3:
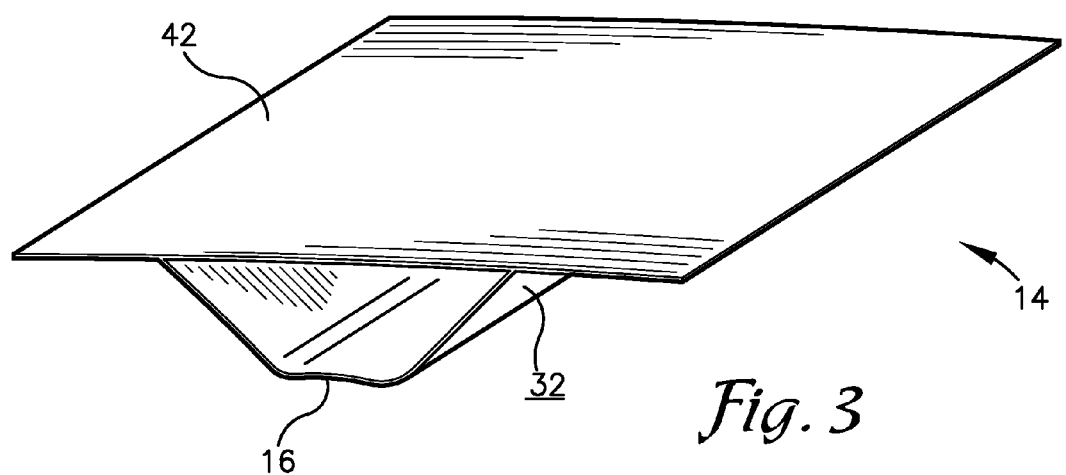
FIG. 3 is a perspective view of an integrated stringer and fuselage skin formed using the solid bladder of FIG. 1.

FIG. 1 illustrates an exemplary embodiment of a solid bladder 10 to provide support inside of a composite aircraft stringer 12, as illustrated in FIG. 2, or an integrated stringer and fuselage skin 14, as illustrated in FIG. 3, during its manufacture.

The bladder 10 may be a solid object composed of silicone, urethane, or similar materials, including any combination thereof. The bladder 10 may be shaped to substantially correspond with the stinger 12 or a stringer section 16 of the integrated stringer and fuselage skin. For example, the bladder 10 may be elongated and may have a first end 18, a second end 20, and one or more side walls 22,24,26,28.

In one embodiment of the invention, the bladder 10 may comprise four side walls 22-28, forming an isosceles trapezoid-shaped cross section, as illustrated in FIG. 1. A first side wall 22 may be opposite to and/or parallel with a second side wall 24 and may be wider than the second side wall 24. A third side wall 26 may and a fourth side wall 28 may extend from opposite edges of the first side wall to corresponding edges of the second sidewall.

The dimensions of the bladder 10 may correspond with the dimensions of the desired stringer 12 or stringer section 16. The bladder 10 may have a length longer than the stringer 12 or stringer section 16 without departing from the scope of the invention. Furthermore, the size of the bladder may be slightly smaller than an internal cavity of the stringer 12 or stringer section 16 at room temperature, because the bladder 10 may be sized based on a coefficient of thermal expansion (CTE) of the bladder 10, which may affect the size of the bladder 10 during curing.

The bladder may be engineered to have particular elastomer material properties and a particular size based on Finite Element Analysis (FEA), taking into account the corresponding CTE due to the difference between the autoclave temperature and room temperature. Using FEA to determine the appropriate elastomer material properties and sizing of the bladder may prevent the stringer and skin from producing bulges on the outside of the aircraft fuselage. Correct sizing of the bladder using FEA may also provide an even and sufficient amount of pressure to composite walls of the stringer or stringer section during the cure cycle and allowing for even resin distribution throughout the composite material of the integrated stringer and fuselage skin.

Figure 4:
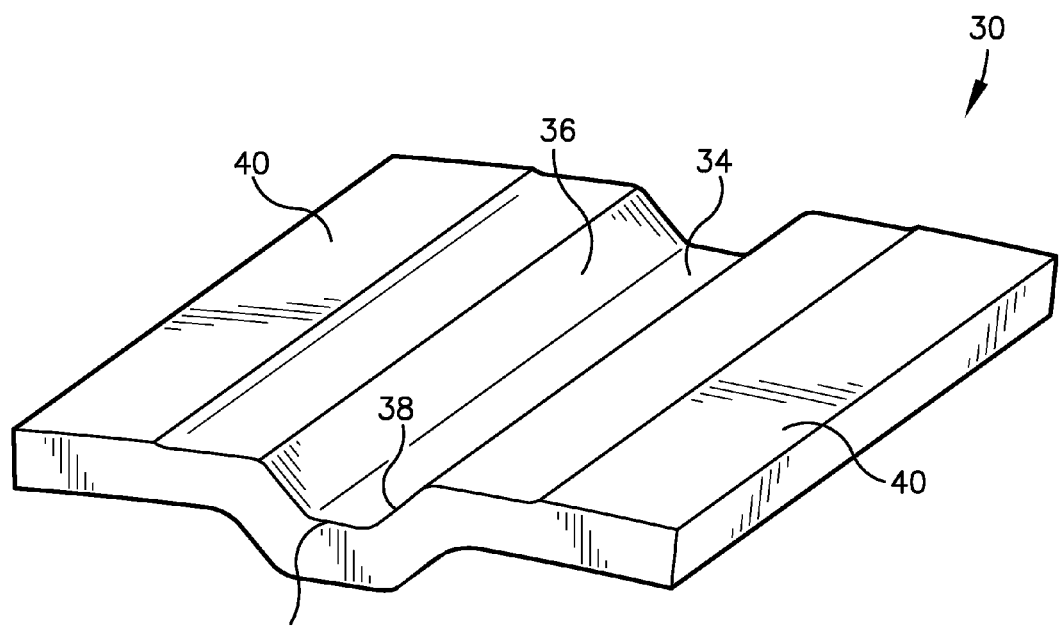
FIG. 4 is a perspective view of a tooling for use with the solid bladder of FIG. 1 to form the stringer of FIG. 2 or the integrated stringer and fuselage skin of FIG. 3.

The FEA may also take into account the thickness of the composite material, the number of composite layers, and/or a size and shape of a tooling 30 for forming the integrated stringer and fuselage skin, as illustrated in FIG. 4. The tooling 30 may be made of metal, such as aluminum, and may comprise a channel 31 sized and shaped to correspond to a size and shape of an outer surface 32 of one or more walls of the composite stringer 12 or the composite stringer section 16. For example, the channel 31 may comprise a bottom wall 34, a first side wall 36, and a second side wall 38. The first and second side walls 36,38 of the channel 31 may extend from two opposing sides of the bottom wall 34 and may be angled away from each other. The angles of the third and fourth side walls 26,28 of the bladder 10 relative to the second side wall 24 of the bladder 10 may substantially correspond with the angles of the first and second side walls 36,38 of the channel 31 relative to the bottom wall 34 of the channel 31.

As illustrated in FIG. 4, secondary portions 40 of the tooling may extend from any side of the channel to provide a surface for forming at least one integral skin portion 42 (illustrated in FIG. 3) of the integrated stringer and fuselage skin 14. The secondary portion may be substantially flat and/or may comprise various contours as required for particular integrated stringer and fuselage skin configurations.

In one embodiment of the invention, the solid bladder may be sized and shaped such that at 350 degrees F., under autoclave pressure, the solid bladder may expand and push against walls of the composite stringer section with a pressure of about 85 lbs/sq. inch. The bladder may be configured to provide an appropriate contact force for creating uniform pressure throughout the composite stringer during the curing cycle.

Figure 6:
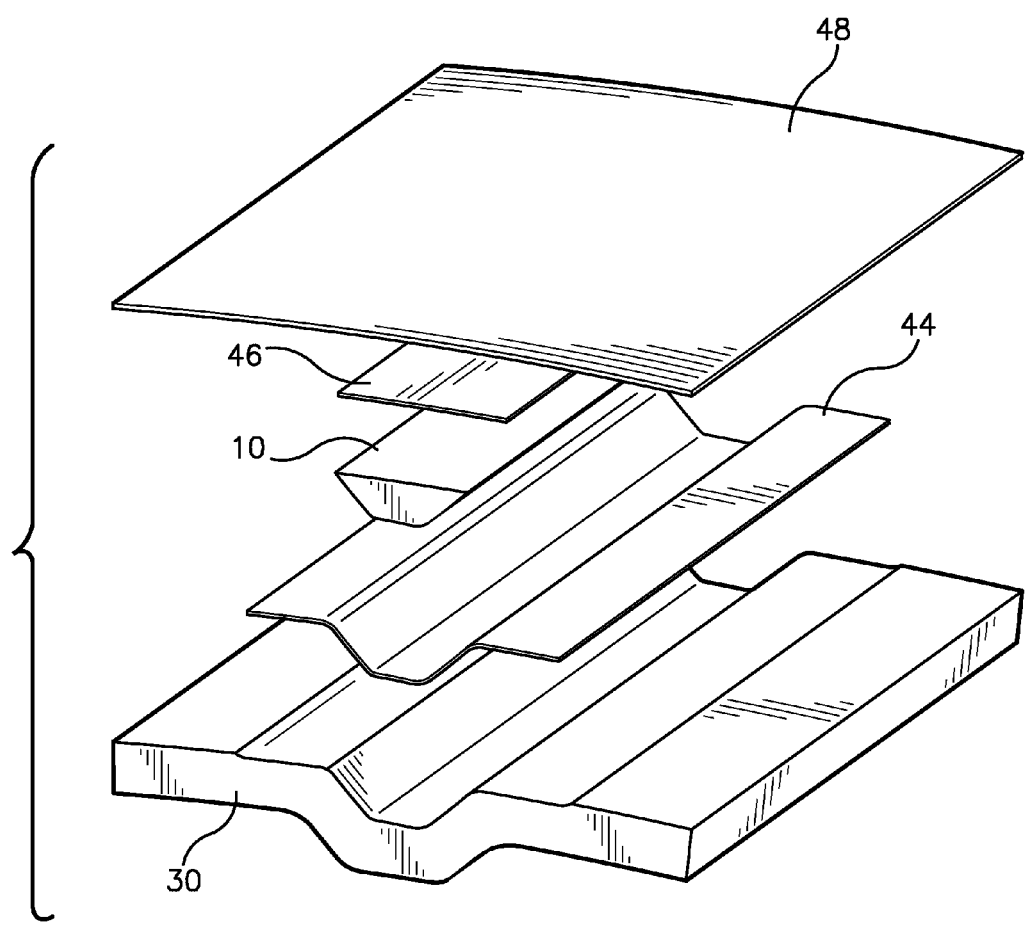
FIG. 6 is an exploded perspective view of the bladder of FIG. 1, the tooling of FIG. 4, and other pieces used to form the stringer and/or the integrated stringer and fuselage skin.
Figure 7:
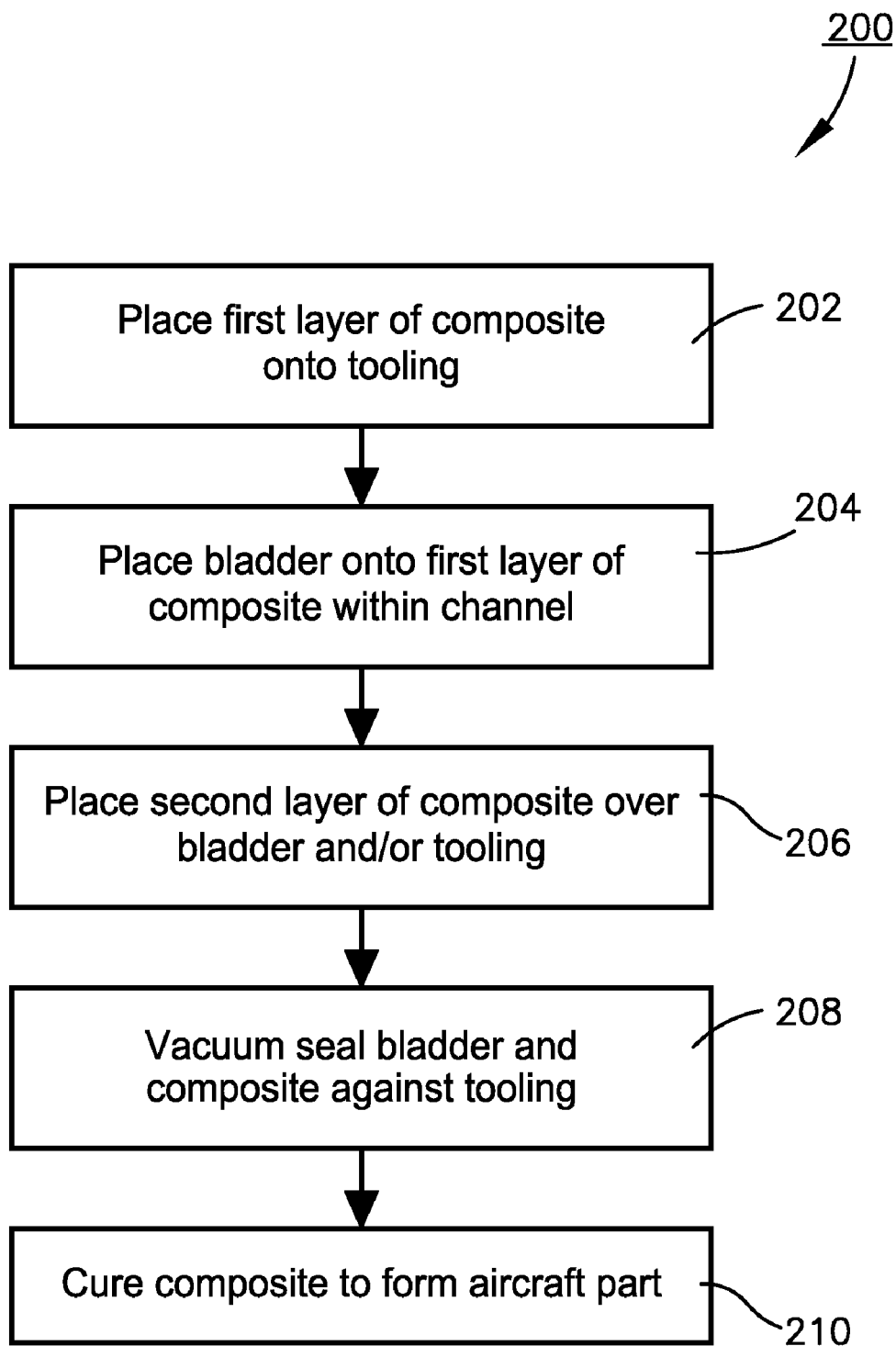
FIG. 7 is a flow chart illustrating a method of making a stringer and/or an integrated stringer and fuselage skin.

A method 200 of manufacturing a stringer and/or an integral stringer and fuselage skin is illustrated in FIG. 7. The method may comprise placing a first layer of composite material 44 of a desired amount of plies and a desired thickness onto the tooling 30, as depicted in step 202 and FIGS. 5-6. For example, the material 44 may be placed into the channel 31 of the tooling 30. Placement of the composite material 44 onto the tooling 30 may be performed using any method known in the art, such as AFP. The material 44 may also extend outward of the channel 31 over at least a portion of the secondary portions 40 of the tooling 30 as well, for forming at least part of the integral skin portions 42.

Figure 5:
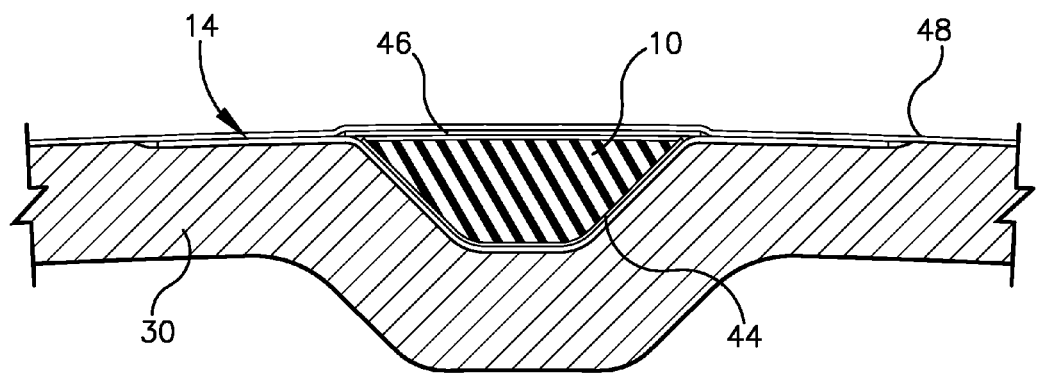
FIG. 5 is a fragmentary, vertical, cross-sectional view of the bladder of FIG. 1 and the tooling of FIG. 4.

Next, the bladder 10 may be placed into the channel 31 atop the composite material 44 placed therein, as depicted in step 204 and FIGS. 5-6. For example, the second side wall 24 of the bladder 10 may be placed to correspond with the bottom wall 34 of the channel 31.

A second layer of composite material 46 may be placed over the first side wall 22 of the bladder 10, as depicted in step 206. The second layer of composite material 46 may also cover at least a portion of the first layer of composite material 44 resting against the secondary portions 40 of the tooling 30. A vacuum bag 48 may then be placed over the composite material and bladder, as illustrated in FIGS. 5-6. The vacuum bag 48 may be sealed and vacuumed against the tooling, as depicted in step 208. The vacuum bag 48 may be any substantially flexible, impermeable material operable to be sealed to the tooling.

Resin may also be distributed throughout the composite material during the application of vacuum pressure using methods known in the art. Then, the tooling, bladder, and composite material may be cured in an autoclave, as depicted in step 210. The autoclave may be any autoclave known in the art. Alternatively, other curing methods may be used to cure the composite material, omitting various steps described herein and/or adding steps for curing the composite material.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of forming a composite aircraft part, the method comprising:
    placing composite material onto a surface of a tooling, wherein at least a portion of the surface of the tooling is contoured, forming a channel;
    placing a solid, monolithic bladder onto the composite material relative the channel, wherein the size and shape of the channel corresponds to the size and shape of the bladder and the composite material between the channel and the bladder;
    choosing a size and elastomer material properties of the bladder, prior to placing the bladder onto the composite material, using finite element analysis (FEA), such that the bladder expands to exert a desired pressure against at least a portion of the composite material during curing;
    placing additional composite material over the bladder;
    vacuum-sealing the composite material and the bladder with the tooling; and
    curing the vacuum-sealed composite material and bladder, thereby forming the part.

2. The method of claim 1, wherein the bladder is composed of at least one of silicone and urethane.

3. The method of claim 1, wherein the bladder is elongated with an isosceles trapezoid-shaped cross section.

4. The method of claim 1, wherein the tooling is formed of metal.

5. The method of claim 1, wherein the bladder is configured to exert approximately 85 lbs/sq, in, on at least a portion of the composite material during curing at approximately 350 degrees F.

6. The method of claim 1, wherein placing composite material comprises using automatic fiber placement to place the composite material against any of the tooling, the bladder, and preceding layers of composite material.

7. The method of claim 1, wherein vacuum sealing the composite material and bladder with the tooling may further comprise evenly distributing resin throughout the composite material.

* * * * *